(12) United States Patent
Troi

(10) Patent No.: US 8,940,125 B2
(45) Date of Patent: Jan. 27, 2015

(54) STRUCTURAL ELEMENT AND METHOD FOR THE PRODUCTION THEREOF

(75) Inventor: Valentine Troi, Innsbruck (AT)

(73) Assignee: superTEXcomposites GmbH, Telfs (AT)

( * ) Notice: Subject to any disclaimer, the term of this patent is extended or adjusted under 35 U.S.C. 154(b) by 166 days.

(21) Appl. No.: 13/320,448

(22) PCT Filed: May 6, 2010

(86) PCT No.: PCT/AT2010/000152
§ 371 (c)(1),
(2), (4) Date: Dec. 7, 2011

(87) PCT Pub. No.: WO2010/129975
PCT Pub. Date: Nov. 18, 2010

(65) Prior Publication Data
US 2012/0128905 A1  May 24, 2012

(30) Foreign Application Priority Data

May 15, 2009 (AT) .................................. A 759/2009

(51) Int. Cl.
| | | |
|---|---|---|
| B32B 1/08 | (2006.01) |
| B29C 70/08 | (2006.01) |
| B29C 70/22 | (2006.01) |
| B29D 23/00 | (2006.01) |
| E04C 2/22 | (2006.01) |
| B29K 105/08 | (2006.01) |
| B29K 105/24 | (2006.01) |

(Continued)

(52) U.S. Cl.
CPC .............. *B29C 70/086* (2013.01); *B29C 70/222* (2013.01); *B29D 23/001* (2013.01); *B32B 1/08* (2013.01); *E04C 2/22* (2013.01); *B29K 2105/0845* (2013.01); *B29K 2105/246* (2013.01); *B29K 2277/10* (2013.01); *B29K 2311/10* (2013.01); *B29L 2023/006* (2013.01); *B29L 2031/10* (2013.01)
USPC ........ 156/294; 156/149; 156/285; 156/303.1; 156/305; 264/258; 264/339; 264/513

(58) Field of Classification Search
CPC .......... B32B 1/08; B32B 5/28; B29C 33/505; B29C 63/34; B29C 70/443; F16L 11/085
USPC .............. 156/149, 156, 285, 287, 294, 303.1, 156/305; 264/258, 339, 513
See application file for complete search history.

(56) References Cited

U.S. PATENT DOCUMENTS

| | | | | |
|---|---|---|---|---|
| 4,005,234 A | * | 1/1977 | Stroupe ......................... | 138/141 |
| 4,187,271 A | * | 2/1980 | Rolston et al. ................ | 264/258 |

(Continued)

FOREIGN PATENT DOCUMENTS

| | | |
|---|---|---|
| CA | 2 363 382 A1 | 8/2000 |
| CH | 459 549 A | 7/1968 |

(Continued)

*Primary Examiner* — John Goff
*Assistant Examiner* — Scott W Dodds
(74) *Attorney, Agent, or Firm* — McGlew and Tuttle, P.C.

(57) ABSTRACT

The invention relates to a method for producing a structural element comprising a fiber-reinforced plastic. According to the invention, a flexible hose is provided with a tubular woven fabric and shaped into the desired form. A plastic that is preferably in liquid form is applied to the tubular woven fabric and is subsequently cured.

3 Claims, 7 Drawing Sheets

(51) Int. Cl.
*B29K 311/10* (2006.01)
*B29L 23/00* (2006.01)
*B29L 31/10* (2006.01)

(56) References Cited

U.S. PATENT DOCUMENTS

| | | | |
|---|---|---|---|
| 4,746,386 A | 5/1988 | Sato et al. | |
| 5,242,637 A * | 9/1993 | Inoue et al. | 264/45.3 |
| 5,259,901 A * | 11/1993 | Davis et al. | 156/154 |
| 5,433,165 A * | 7/1995 | McGuiness et al. | 114/357 |
| 5,857,494 A * | 1/1999 | Tsukamoto et al. | 138/140 |
| 6,082,075 A | 7/2000 | Rysgaard | |
| 6,510,961 B1 * | 1/2003 | Head et al. | 220/645 |
| 6,730,382 B2 * | 5/2004 | Fanucci et al. | 428/36.9 |
| 2001/0048995 A1 * | 12/2001 | Eschenfelder et al. | 428/69 |
| 2009/0014081 A1 | 1/2009 | Limas | |

FOREIGN PATENT DOCUMENTS

| | | |
|---|---|---|
| DE | 103 04 044 A1 | 8/2004 |
| EP | 1 170 117 A1 | 1/2002 |
| EP | 1 264 717 A2 | 12/2002 |
| EP | 1 878 562 A1 | 1/2008 |
| GB | 1 288 284 A | 9/1972 |
| JP | 57 022016 A | 2/1982 |
| JP | 58 119 822 A | 7/1983 |
| WO | 95/30532 | 11/1995 |

* cited by examiner

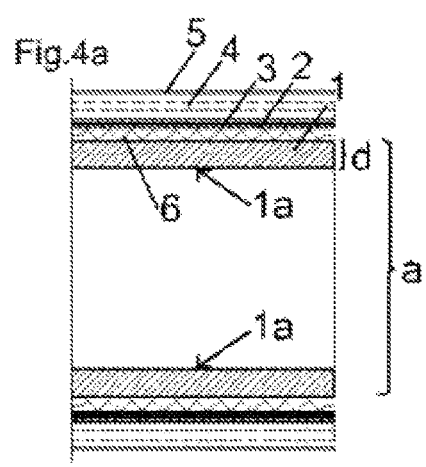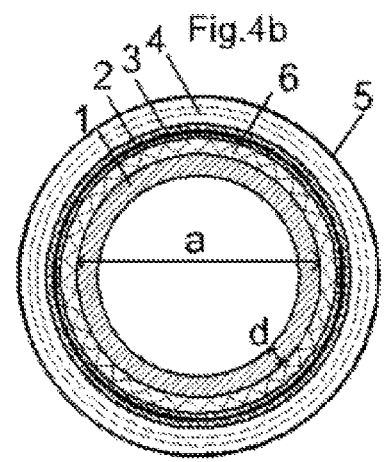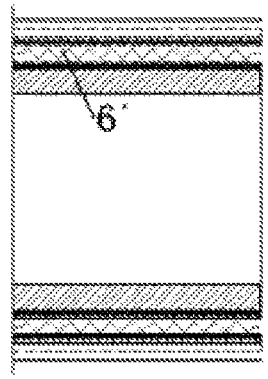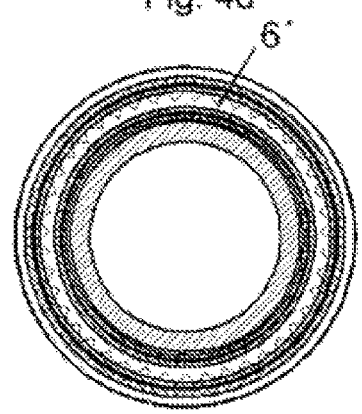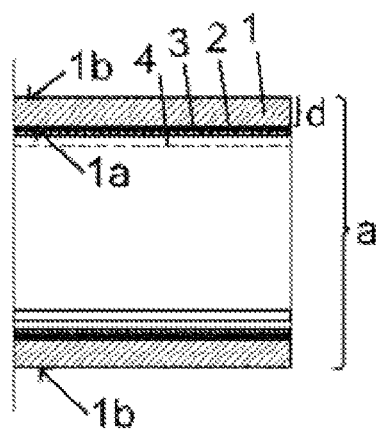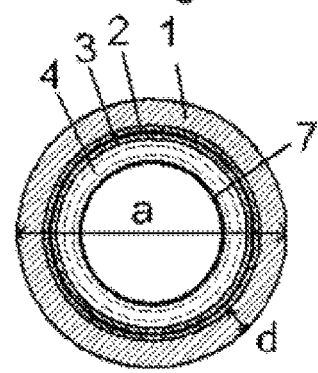

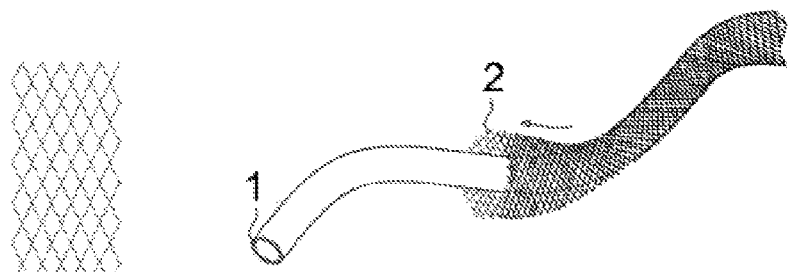
Fig. 10a
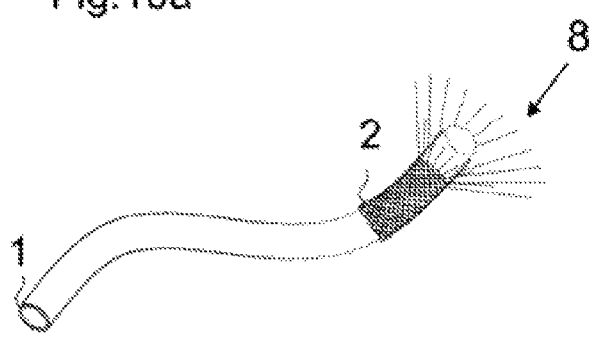
Fig. 10b
Fig. 11a
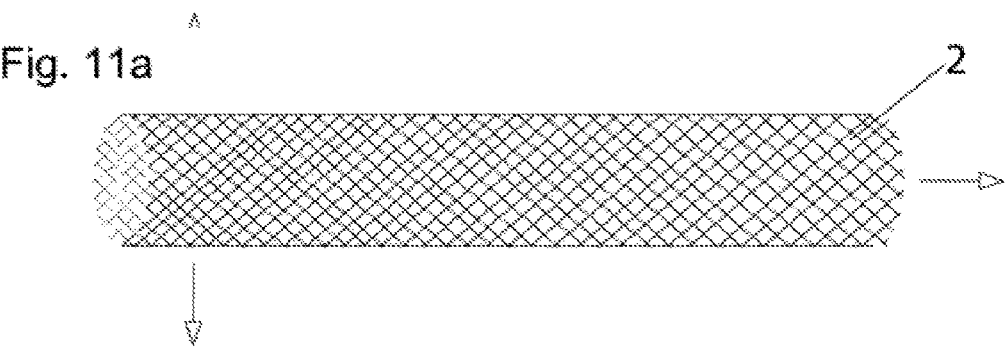
Fig. 11b
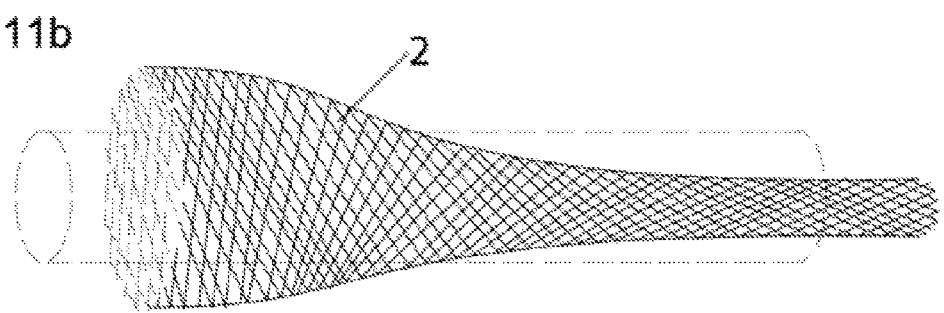

STRUCTURAL ELEMENT AND METHOD FOR THE PRODUCTION THEREOF

CROSS REFERENCE TO RELATED APPLICATIONS

This application is a United States National Phase application of International Application PCT/AT2010/000152 and claims the benefit of priority under 35 U.S.C. §119 of Austrian Patent Application Ser. No. A 759/2009 filed May 15, 2009, the entire contents of which are incorporated herein by reference.

FIELD OF THE INVENTION

The invention relates to a method for producing a structural element, comprising a fiber-reinforced plastics material. The invention also relates to such structural elements and to the use of individual structural elements of this type in a relatively large composite structure, for example in construction modules, support elements, supporting frameworks and freely formable and configurable plane load-bearing structures.

BACKGROUND OF THE INVENTION

From U.S. Pat. No. 6,082,075, it is already known to produce structural elements, comprising a fiber-reinforced plastics material. In this respect, a skeleton consisting of tubes and frames is shaped into the desired form using a plurality of retaining elements and is then provided with a woven fabric which is wound round this skeleton. Finally, a plastics material is applied which is cured and provides the structural element with the final shape. To put it simply, U.S. Pat. No. 6,082,075 proposes the production of spar beams, whereby a skeleton is shaped into the desired form and then wrapped in a woven fabric and thereafter a curable plastics material is applied to said woven fabric.

A disadvantage of the method described in U.S. Pat. No. 6,082,075 is that the production of the shaping skeleton consisting of tubes, retaining elements and frames is very complex and due to this complexity of the proposed skeleton, the moldability of the structural elements is subject to narrow limits. Thus, for example, narrow bend radii or relatively complex topologies, such as loops or knots cannot be achieved or can only be achieved at a considerable expense. Furthermore, the application of woven fabric by winding round the final shape, proposed in U.S. Pat. No. 6,082,075, is very complex and in addition, the surface which can be achieved thus has visual impairments due to the winding structure of the woven fabric.

U.S. Pat. No. 6,082,075 proposes a further method in which, instead of the shaping skeleton consisting of tubes, retaining elements and frames, an inflatable bladder is used as a positive mold for the application of the fiber-reinforced plastics material, and this bladder has to be configured such that as a result of being inflated, it assumes the desired shape onto which the woven fabric is then applied by winding.

This method has the disadvantages that on the one hand, the production of such an inflatable positive mold, which is to assume the desired shape due to the inflation pressure, is very complex and on the other hand, here as well narrow bend radii or relatively complex topologies, such as loops or knots cannot be achieved, or can only be achieved at a considerable expense.

Furthermore, the structural elements proposed in U.S. Pat. No. 6,082,075 are unsuitable, or are only suitable at a disproportionately high production cost and outlay for combining into relatively complex construction modules, support elements, supporting frameworks and freely formable and configurable plane load-bearing structures.

SUMMARY OF THE INVENTION

An object of the present invention is to provide a method and a structural element of the type mentioned at the outset, for which the disadvantages described above are reduced and which are particularly suitable for the production of complex structures, such as construction modules, support elements, supporting frameworks and freely formable and configurable plane load-bearing structures.

The object is achieved by a method which is characterized in that a flexible tube is provided with a tubular woven fabric and is shaped into the desired form, and a preferably liquid plastics material applied to the tubular woven fabric is then cured.

For this, it can be provided that a flexible tube is provided with a tubular woven fabric, a liquid plastics material is then applied to the tubular woven fabric, the flexible tube together with woven fabric and liquid plastics material is shaped into the desired form and then the plastics material is cured. Alternatively, it can be provided that the tubular woven fabric is already provided with the plastics material before the flexible tube is provided with the tubular woven fabric.

Thus, the invention is based on the understanding that a preferably extensible tubular woven fabric can be brought into contact faster with the flexible tube acting as the shaping element and the subsequent impregnating with liquid plastics material can be performed more simply than when a strip-shaped woven fabric has to be wound round a positive mold. In this respect, it is particularly also advantageous that before the flexible tube (acting as the shaping element) is shaped into the desired final form, it can be provided with the tubular woven fabric (for the fiber reinforcement of the plastics material). In the production, provided according to the invention, of relatively complex structures and arrangements which consist of a combination of a plurality of structural elements according to the invention, it is thus possible to provide the individual structural elements with the woven fabric before they are joined together to form the composite structure and before the final shaping procedure. The production of complex elements (such as construction modules, support elements, supporting frameworks and freely formable and configurable plane load-bearing structures) can thus be substantially simplified, compared to methods in which the woven fabric is only wound round the final form, and thus it is possible to obtain significant advantages in terms of production and cost.

The method proves to be particularly advantageous when the tubular woven fabric is introduced inside the flexible tube. Structural elements produced according to U.S. Pat. No. 6,082,075 have to practically always accommodate the shaping element in the interior, i.e. the woven fabric has to be wound externally onto the shaping element. In contrast thereto, with a tubular woven fabric it is possible to introduce said fabric inside the flexible tube, i.e. onto the inner lateral surface of the flexible tube and to then produce the final structural element by applying liquid plastics material which is cured. In this respect, it is advantageously provided that the liquid plastics material is introduced inside the flexible tube by applying an elevated pressure or a reduced pressure. The liquid plastics material can also be introduced through a spray nozzle which is drawn through the inside of the flexible tube. Furthermore, it can be provided according to the invention after the tubular woven fabric has been impregnated with liquid plastics material to remove excess plastics material from the internal volume of the tube by means of excess pressure or vacuum or by mechanical means, which provides advantages in terms of weight and cost.

In a variant, it can be provided that the preferably extensible tubular woven fabric is put over the flexible tube. In this case, it is favorable for the tubular woven fabric to be coated and/or sprayed and/or imprinted with the liquid plastics material.

Alternatively, it can be provided that the tubular woven fabric is braided or woven from rovings onto the flexible tube. The roves of the tubular woven fabric can be mixed with liquid plastics material before weaving or braiding. In general, the tubular woven fabric can equally be a meshwork so that a tubular meshwork also applies here. The tubular woven fabric or tubular meshwork can be woven on or braided on by hand or by machine, for example by a braiding machine.

For the method, it is advantageous if the flexible tube is selected from the group consisting of rubber, PVC, PE, PA, PU, silicones or PTFE.

It can preferably be provided for the tube to be at least partly removed after the plastics material has cured. In this case, only the fiber-reinforced plastics material remains as a structural element. This is particularly easy to achieve in the method in which the tubular woven fabric is introduced inside the flexible tube, because the flexible tube can be cut open, for example and removed. However, if the flexible tube is arranged inside the fiber-reinforced plastics material, it can then be effectively removed when it reduces its diameter by extending in the longitudinal direction and can thus be detached from the glass fiber-reinforced plastics material, because its outer diameter is smaller than the inner diameter of the glass fiber-reinforced plastics material. However, it can also be provided that the tube adheres to the structural element.

The flexibility of the tube should be configured such that it can be shaped into the desired form without expending a considerable amount of force. For this purpose, it is advantageous (also depending on the respective choice of material) if the tube has a diameter of 5 mm to 100 mm and a wall thickness of 0.5 to 15 mm. The flexibility of the tube depends, inter alia, on the modulus of elasticity of the material. Starting from the average wall thickness of the tube and the choice of material, it is favorable if the tube is sufficiently flexible that it can be shaped into the desired form by a force of less than 500 N, preferably less than 100 N. The modulus of elasticity is stated as standard in N/mm$^2$ and at a temperature of 20° C. Accordingly, flexible tubes can of course also be used. A person skilled in the art can easily establish from this which materials and cross-sectional surfaces of the tube he should select. In the simplest case, the flexible tube has an annular cross section, and is thus configured, for example as a circular cylinder barrel. Of course, the tube can also have cross-sectional shapes other than a circular ring. The tube can have both an inner contour and an outer contour (in cross section) which is polygonal-like, rectangular, square, elliptic or it can have another closed curved shape.

A further advantage of the invention is that the flexible tube used as the shaping element can be shaped into the final form due to its inherent rigidity, in that forces and/or torques are only applied at individual points. For example in this way, shapes such as bends, S-curves, so-called spline curves and loops right up to knots can be achieved without a complex mold construction. The shaping can be performed by a CNC controlled molding machine.

It is also provided according to the invention that a combination of individual structural elements according to the invention is shaped into the final form before the plastics material is cured, by introducing forces and/or torques only at individual points, as a result of which it is also possible to produce freely formed plane load-bearing structures, for example, without a complex mold construction.

In a variant, it can be provided that the tubular woven fabric has a plurality of layers and/or that additional layers are provided to impart a greater rigidity to the structural element.

In the simplest case, it can be provided that the liquid plastics material is cured by polymerization. Plastics materials in particular, selected from the group of epoxy resins, polyester resins, vinyl ester reins or mixtures thereof have proved successful here. Polymerization can be carried out in a manner known per se, for example by UV radiation, by a thermal treatment or by air drying, etc.

It can also be provided that the tubular woven fabric is selected from the group of woven and braided glass fibers, carbon fibers, aramid fibers, basalt fibers, hemp, flax, cotton or mixtures thereof. Glass fibers have proved to be the preferred embodiment, since on the one hand they are cost effective, at the same time as having a very high loading capacity. In addition, because they are colorless, they can preferably be used in many areas which are to be permeable to light.

More particularly, it is provided that the tubular woven fabric is in the form of a cylinder barrel. Furthermore, it is preferably provided that the tubular woven fabric is woven such that it is extensible radially and in the longitudinal direction, which is advantageous for applying onto or introducing into the flexible tube acting as the shaping element. In this respect, a fabric which has been woven or braided biaxially, for example, can prove to be favorable.

In the variant in which the tubular woven fabric is located on the outside, it is particularly preferably provided that the tubular woven fabric is woven or braided such that when it is pulled in the longitudinal direction, its radius decreases. Consequently, when a tubular woven fabric is chosen, the internal diameter of which is a few percent larger than the external diameter of the flexible tube, the tubular woven fabric can be easily pulled over the flexible tube and then, simply by pulling on both ends, can be firmly tightened on the tube serving as a shaping element, which is advantageous both for the simplicity of the method and for the achievable quality of the surface.

In the variant in which the tubular woven fabric is located on the inside, it is particularly preferably provided that the tubular woven fabric is woven such that it is radially extensible, so that for ease of introduction into the shaping tube, a tubular woven fabric can be chosen, the external diameter of which is a few percent smaller than the internal diameter of the tube, and then the tubular woven fabric can be radially extended and applied snugly against the inner wall of the shaping tube, for example by suitable brushes or by inserting and inflating a further inflatable inner tube.

In the case of a mechanical braiding of the fiber component (rovings) onto the flexible tube which acts as a shaping element, a tubular woven fabric which is braided triaxially for example can prove to be favorable, because this braid variant provides the structural element with constructive advantages (and an extension which is only possible for biaxial braids is unnecessary due to the direct braiding-on procedure).

In a variant, it can be provided that the tubular woven fabric, optionally before being provided with liquid plastics material, is provided with an additional tubular sheath, preferably a heat-shrinkable tubing, before the plastics material is cured. The result of this measure is that the surface of the cured plastics material is more even, which provides, for example, more visually aesthetic results, because the additional tubular sheath predetermines the superficial structure.

An improved impregnation of the fiber component with the liquid plastics material is also obtained. The additional tubular sheath is preferably a heat-shrinkable tubing, i.e. a tube which contracts when the temperature is increased, since heat-shrinkable tubings are easy to handle. This heat-shrinkable tubing preferably consists of polyolefins, such as PE, PTFE, PVE etc.

In this respect, it can be provided that the additional tubular sheath, preferably a heat-shrinkable tubing, is removed after the plastics material has cured, specifically if the surface of the structural element which is obtained is to be formed from the cured plastics material. Theoretically, however, the additional tubular sheath can also remain on the structural element.

From the point of view of handling, it has proved to be advantageous when the liquid plastics material is infused between the flexible tube and the additional tubular sheath. In this respect, it can also be provided that a flow aid is introduced between the additional tubular sheath, preferably a heat-shrinkable tubing, and the tubular woven fabric or between the flexible tube and the tubular woven fabric. The flow aid can also be braided on, for example. The flow aid produces on the one hand an improved infusibility of the plastics material and on the other a sandwich effect for stabilizing the finished structural element. Consequently, a greater static loading capacity is achieved. The flow aid can be, for example a mesh-type braid or a web-type woven fabric consisting of plastics material fibers, such as PE, polyamide, PP, etc.

The object set at the beginning is also achieved by a corresponding structural element. This element comprises at least one flexible tube, a tubular woven fabric and a cured plastics material which is applied to the tubular woven fabric. In this case as well it can be provided that the tubular woven fabric is arranged on the inner lateral surface of the flexible tube. Alternatively, it can be provided that the tubular woven fabric is arranged on the outer lateral surface of the flexible tube. In a further aspect, the invention relates to a structural element comprising at least one tubular woven fabric and a cured plastics material, selected from the group of epoxy resins, polyester resins, vinyl ester resins or mixtures thereof, which is applied to the tubular woven fabric.

In addition, it can be provided regarding the structural element that a further tubular sheath, preferably a heat-shrinkable tubing is arranged on the tubular woven fabric.

In general, it can be stated regarding the structural element that the above-mentioned materials and dimensions relevant to the method also apply to the structural element. This means that the flexible tube can be selected from the group of rubber, PVC, PE, PA, PU, silicones and PTFE. The dimensions of the flexible tube can be between 5 mm and 100 mm, with an average wall thickness of 0.5 mm to 15 mm. The tubular woven fabric can be formed in several layers and the cured plastics material can be a polymer from the group of epoxy resins, polyester resins, vinyl ester resins or mixtures thereof. The structural element is preferably hollow inside.

The tubular woven fabric is preferably produced from the group of woven glass fibers, carbon fibers, aramid fibers, basalt fibers, hemp, flax, cotton or mixtures thereof, and is ideally in the shape of a cylinder barrel. More preferably, the tubular woven fabric is extensible radially and in the longitudinal direction, in that it is woven biaxially, for example.

With regard to both the method and the structural element, it is particularly preferably provided that the flexible tube is brought into direct contact with the tubular woven fabric, i.e. the tubular woven fabric directly adjoins the flexible shaping tube. The flexible tube can also be perforated at last in certain portions. This can reduce the mass of the structural element, without resulting in an appreciable reduction in stability.

In a further aspect, the invention relates to diverse possibilities of use of the previously described structural elements. On the one hand, this can comprise a simple arrangement of a plurality of such structural elements. Furthermore, more complex arrangements are conceivable, such as construction modules, support elements, supporting frameworks and freely formable and configurable plane load-bearing structures, roof constructions or other structures which can be produced by such structural elements.

Consequently, in a further aspect, the invention relates to such arrangements and methods for producing such arrangements. For this, it is provided according to the invention that at least two structural elements are produced according to the previously described method and are joined together. In this respect, the at least two structural elements can be joined together before the plastics material is cured. Thus, it is either possible to join together the flexible tube which has been provided with the tubular woven fabric with a second flexible tube which has been provided with a tubular woven fabric, before or after the plastics material is applied and to then cure the plastics material. The joining procedure can be carried out in a manner known per se, using retaining elements, adhesive joins, etc.

Typical areas of use of the structural elements of the aforementioned type are, for example in roof constructions, ceiling elements, facade elements, parts of furniture, illumination bodies, in room installations or the like. The previously mentioned structural elements can also be combined with or incorporated into other materials, for example textiles, panel-shaped materials etc.

The present invention will be explained in more detail below on the basis of drawings, which show exemplary embodiments only. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 4a is a longitudinal sectional view of a fourth embodiment of a structural element according to the invention;

FIG. 4b is a cross-sectional view of a fourth embodiment of a structural element according to the invention;

FIG. 4c is a longitudinal sectional view of a fifth embodiment of a structural element according to the invention;

FIG. 4d is a cross-sectional view of a fifth embodiment of a structural element according to the invention;

FIG. 5a is a longitudinal sectional view of a sixth embodiment of a structural element according to the invention;

FIG. 5b is a cross-sectional view of a sixth embodiment of a structural element according to the invention;

FIG. 10a is a detail view for method step "A" of FIG. 6;

FIG. 10b is a detail view for method step "A" of FIG. 7;

FIG. 11a is a view showing a tubular woven fabric in a different position for use for a method according to the invention;

FIG. 11b is a view showing a tubular woven fabric in a different position for use for a method according to the invention;

DESCRIPTION OF THE PREFERRED EMBODIMENTS

Figure 1A:
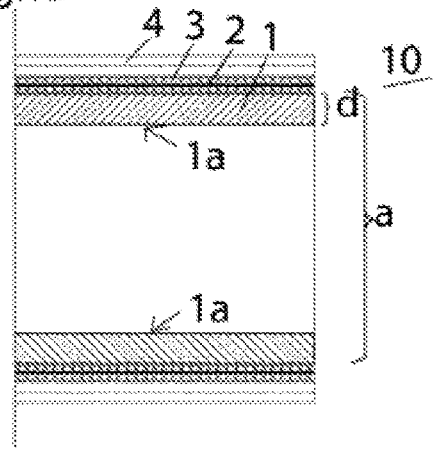
FIG. 1a is a longitudinal sectional view of a first embodiment of a structural element according to the invention.
Figure 1B:
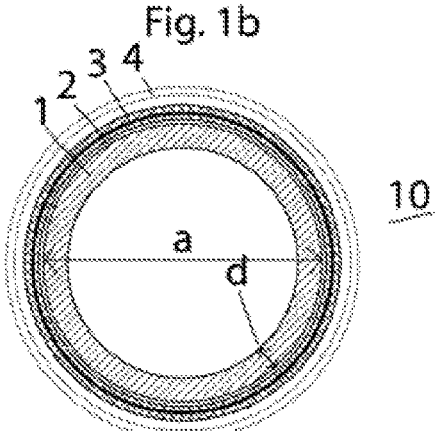
FIG. 1b is a cross-sectional view of a first embodiment of a structural element according to the invention.

FIG. 1a is a longitudinal sectional view of a structural element 10 according to the invention. FIG. 1b shows the corresponding cross section of the structural element 10. A flexible supporting tube 1 is provided inside as the structuring element. Applied around the flexible tube 1 is a tubular woven fabric 2 which rests on the outer lateral surface of the tube 1, onto which tubular woven fabric 2 a plastics material 3 is then applied which forms a matrix. The layer 4 characterizes a further layer with or without a tubular woven fabric and a plastics material. The average external diameter a of the flexible tube 1 is approximately 30 mm, the average wall thickness d is 1.5 mm (the arithmetic average is considered to be the average value).

Figure 2A:
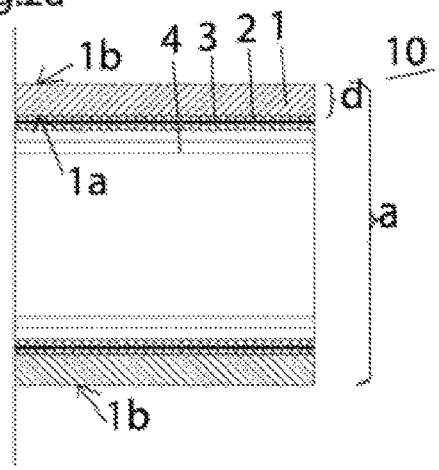
FIG. 2a is a longitudinal sectional view of a second embodiment of a structural element according to the invention.
Figure 2B:
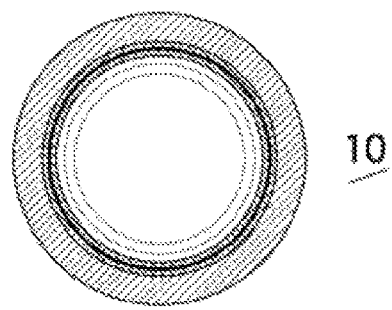
FIG. 2b is a cross-sectional view of a second embodiment of a structural element according to the invention.

FIGS. 2a and 2b show the analogous views to FIGS. 1a and 1b, although here the sequence of the individual layers has been changed. Now arranged on the inner lateral surface 1a of the flexible supporting tube 1 is a tubular wove fabric 2 which is then provided with a curable plastics material composition 3. The layer 4 characterizes a further such layer. The embodiments shown in FIG. 1a to 2b comprise a flexible tube 1 consisting of PVC, a tubular woven fabric 2 consisting of glass fiber woven fabric and a plastics material which comprises cured polyester resin.

Figure 3A:
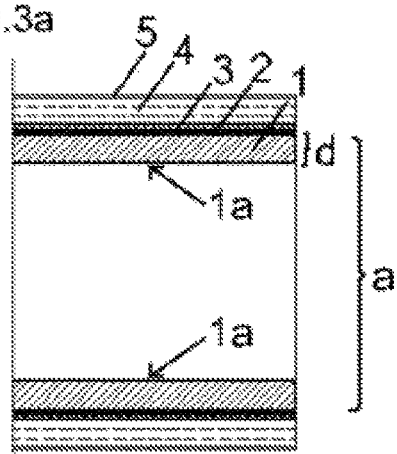
FIG. 3a is a longitudinal sectional view of a third embodiment of a structural element according to the invention.
Figure 3B:
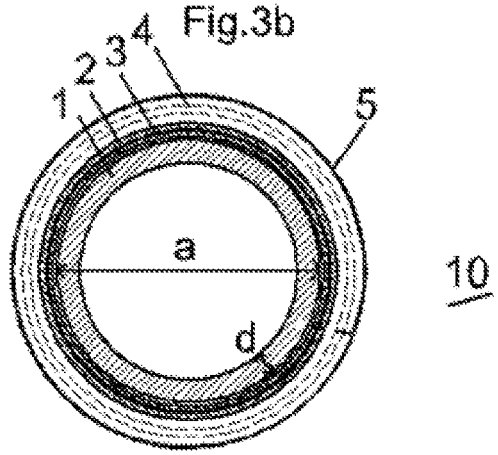
FIG. 3b is a cross-sectional view of a third embodiment of a structural element according to the invention.

FIGS. 3a and 3b show a further variant based on the embodiment of FIGS. 1a and 1b. It is again possible to see on the inside a flexible supporting tube 1 as the structuring element. Applied around the flexible tube 1 is a tubular woven fabric 2 which rests against the outer lateral surface of the tube 1, onto which tubular woven fabric 2 a plastics material 3 is then applied which forms a matrix. The layer 4 characterizes a further layer with or without a tubular woven fabric and a plastics material. In addition, a further tubular sheath 5 is arranged as a heat-shrinkable tubing on the tubular woven fabric 2.

The embodiment of FIGS. 4a and 4b shows a variant of the embodiment of FIGS. 3a and 3b, but in this case with a flow aid 6 between the flexible tube 1 and the tubular woven fabric 2 for a better infusion of liquid plastics material. FIGS. 4c and 4d also show a variant of the embodiment of FIGS. 3a and 3b, but this time with a flow aid 6 between the tubular woven fabric 2 and the further tubular sheath 5, the heat-shrinkable tubing.

The embodiment of FIGS. 5a and 5b is based on the embodiment of FIGS. 2a and 2b. In addition, a further tubular sheath 5 is inside, which in this embodiment is configured to be inflatable.

Figure 6:
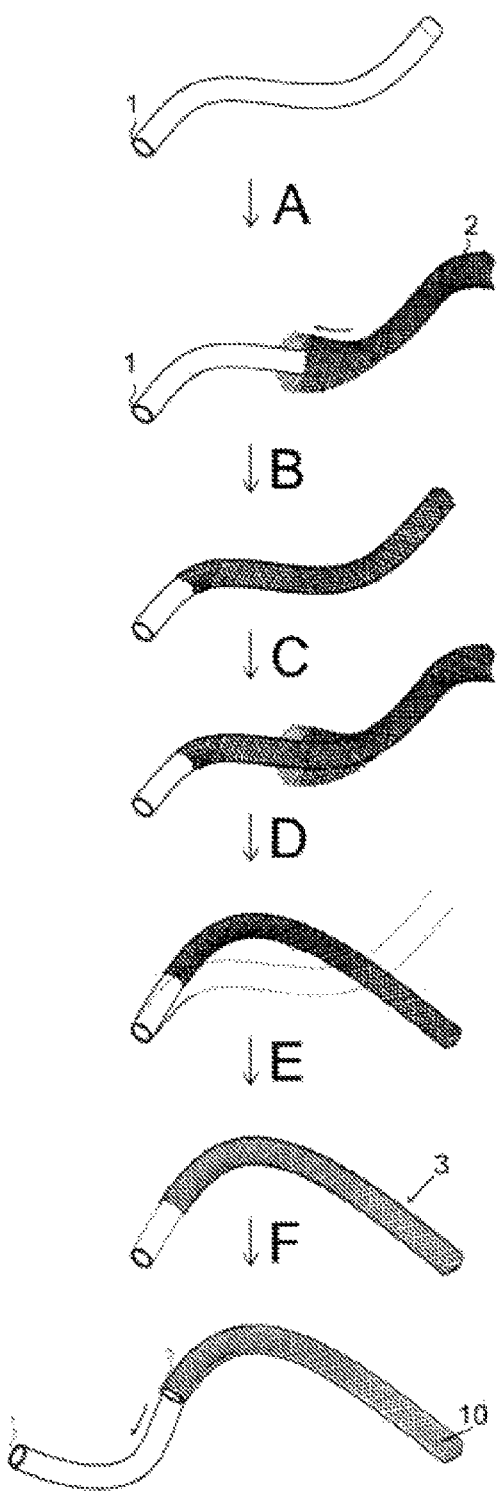
FIG. 6 is a view of individual method steps for a first method according to the invention.

FIG. 6 shows the individual steps of a method for producing a structural element 10, in which the flexible tube 1 is arranged inside the structural element 10. Starting from the flexible tube 1, in step A the tubular woven fabric 2 is put over the flexible tube 1 and positioned against the outer lateral surface 1a, as can be seen in step B. In step C, a second tubular woven fabric 2' is applied and pulled tight accordingly. Step D shows that the flexible tube 1 together with the tubular woven fabric 2, 2' is shaped into the desired form. Retaining elements (not shown) can be used for this purpose. In step E, a liquid plastics material is then applied as plastic resin 3 to the tubular woven fabric 2, 2', so that a fiber-reinforced plastics material is formed with two tubular woven fabrics 2, 2'. The plastic resin 3 is then cured, so that the finished structural element 10 is produced. In an optional step F, the tube 1 is removed again from the cured structural element.

Figure 7:
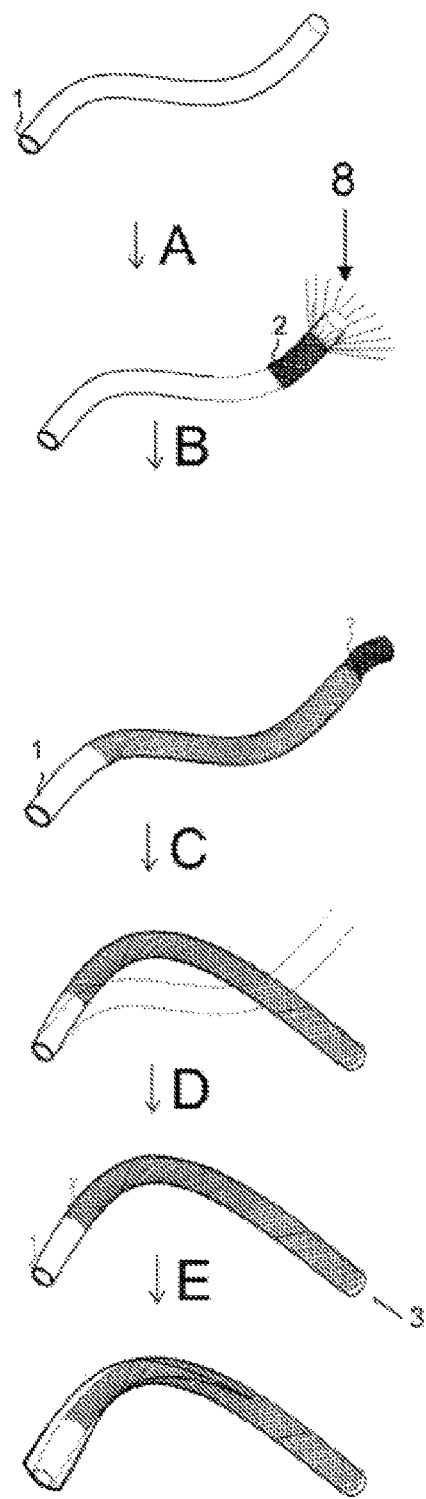
FIG. 7 is a view of method steps for a second method according to the invention.

FIG. 7 shows an alternative to the example of FIG. 6. Here, the tubular woven fabric 2 is introduced inside the tube 1. On the one hand, the tubular woven fabric 2 can be braided from individual rovings 8 directly onto a further tubular sheath 5 which assumes the function of an insertion aid 5 (indicated by the individual rovings 8 of the tubular woven fabric in step A). On the other hand, the tubular woven fabric 2 can be prefabricated and pushed onto the insertion aid 5 (not shown). The insertion aid 5 (inflatable tube 5) and the tubular woven fabric 2 are positioned by inserting inside the flexible tube 1 (step B). In step C, the flexible tube 1 together with the tubular woven fabric 2 are shaped into the desired form. Step D schematically shows the application of the liquid plastics material 3. To achieve this, for example the plastic resin can be introduced by pressure inside the tube 1 (in the direction of the arrow). In so doing, it is advantageous to introduce the pressure only into the volume between the tube 1 and the inflatable tube 5, so that the plastic resin only impregnates the tubular woven fabric 2 located between tube 1 and inflatable tube 5 and does not fill the entire internal volume of tube 1, which provides advantages in terms of cost and weight. It would also be possible to advantageously apply a relatively low pressure (for example a vacuum) again only to the volume between tube 1 and inflatable tube 5, on the other side of the tube 1, to convey the plastic resin inside the tube 1. After the plastic resin has been introduced, the inflatable tube 5 can be removed by excess pressure or vacuum. After a curing step, in the optional step E, the outer sheath (flexible tube 1) is cut open and removed. The fiber-reinforced plastics material remains as the structural element 10 with a particularly smooth outer contour, since this has assumed the inner contour of the tube 1. However, step E can also be omitted.

Figure 8:
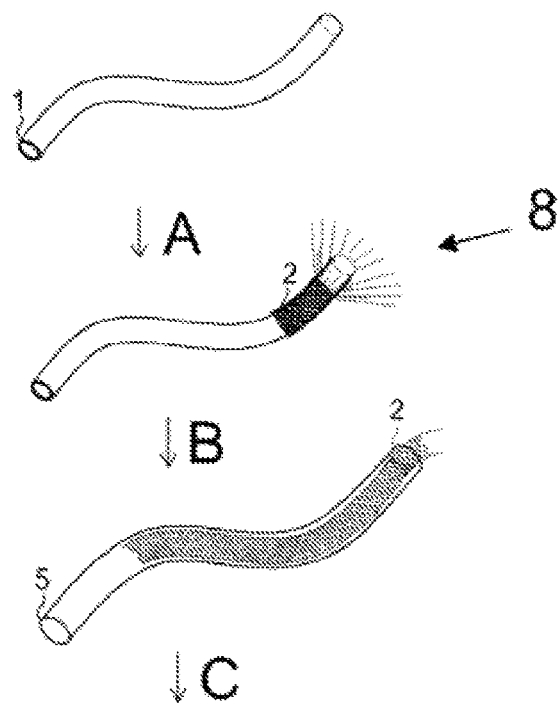
FIG. 8 is a view of method steps for a further method according to the invention.

FIG. 8 shows individual steps of a method for producing a further embodiment of a structural element 10, in which the flexible tube 1 is arranged inside the structural element 10. Starting from the flexible tube 1, in step A, a tubular woven fabric 2 consisting of rovings 8 is woven onto the flexible tube 1 and applied onto the outer lateral surface 1a (step A). In step B, an additional tubular sheath 5 in the form of a heat-shrinkable tubing is applied onto the tubular woven fabric 2. The flexible tube 1 with tubular woven fabric 2 and heat-shrinkable tubing 5 is then shaped into the desired final form (step C). In step D, the heat-shrinkable tubing 5 is shrunk under the effect of temperature, so that it rests closely against the tubular woven fabric 2. In step E, a liquid plastics material is applied as plastic resin 3 onto the tubular woven fabric 2, in that it is introduced between the heat-shrinkable tubing 5 and the flexible tube 1 so that the tubular woven fabric is wetted with the liquid plastic resin 3. The plastic resin 3 is then cured. In an optional step F, the heat-shrinkable tubing 5 can be removed. Steps C and D can also be carried out in the opposite sequence.

Figure 9:
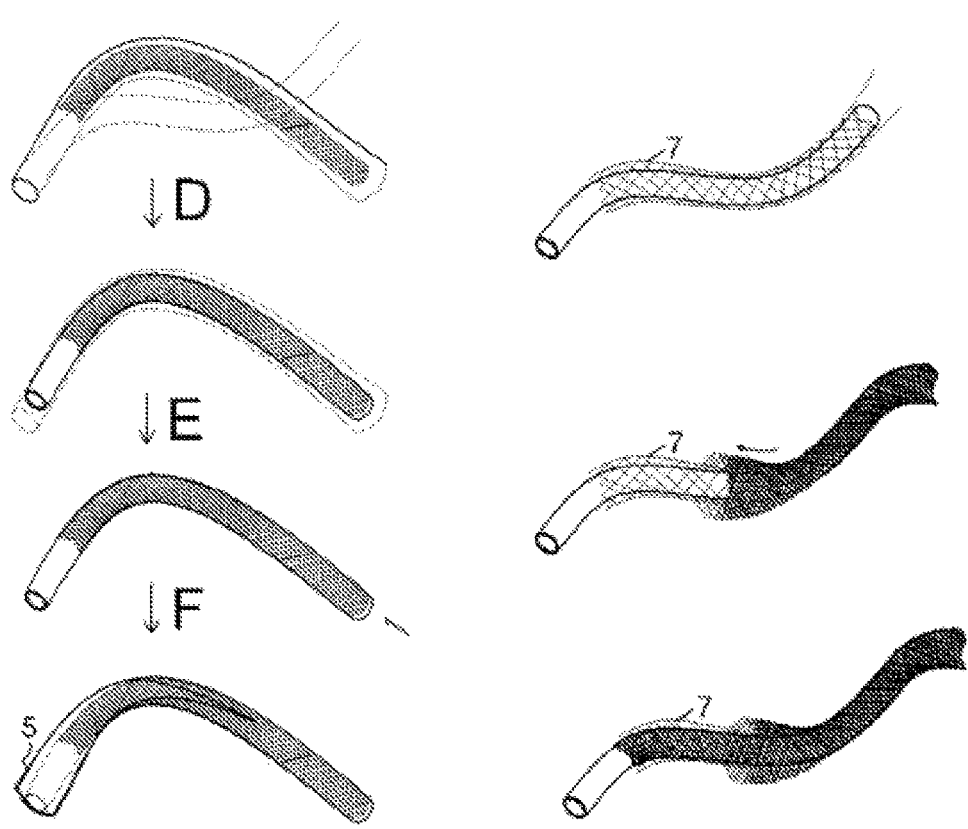
FIG. 9 is a view of method steps for a further method according to the invention.
Figure 12A:
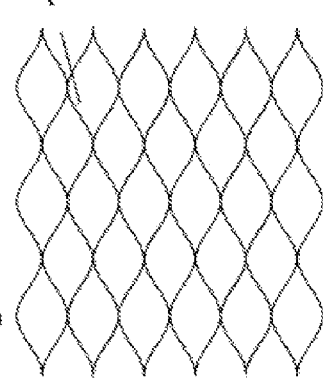
FIG. 12a is a view showing one possible arrangement of a structural element according to the invention.
Figure 12B:
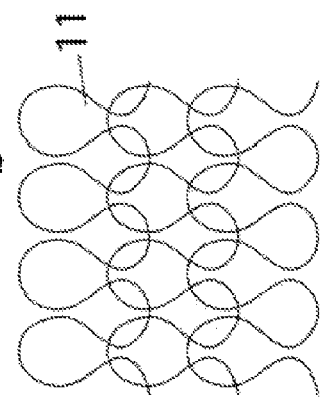
FIG. 12b is a view showing another possible arrangement of a structural element according to the invention.
Figure 12C:
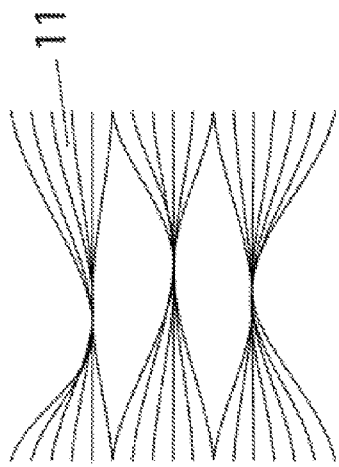
FIG. 12c is a view showing yet another possible arrangement of a structural element according to the invention.
Figure 12D:
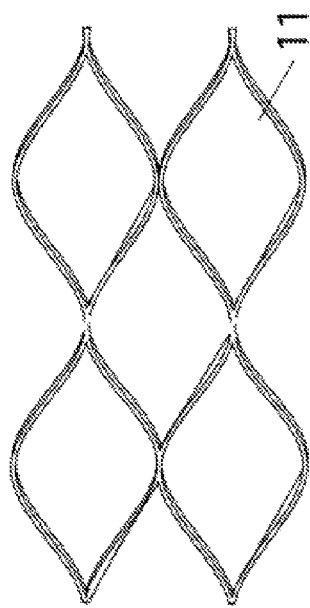
FIG. 12d is a view showing yet another possible arrangement of a structural element according to the invention.
Figure 12E:
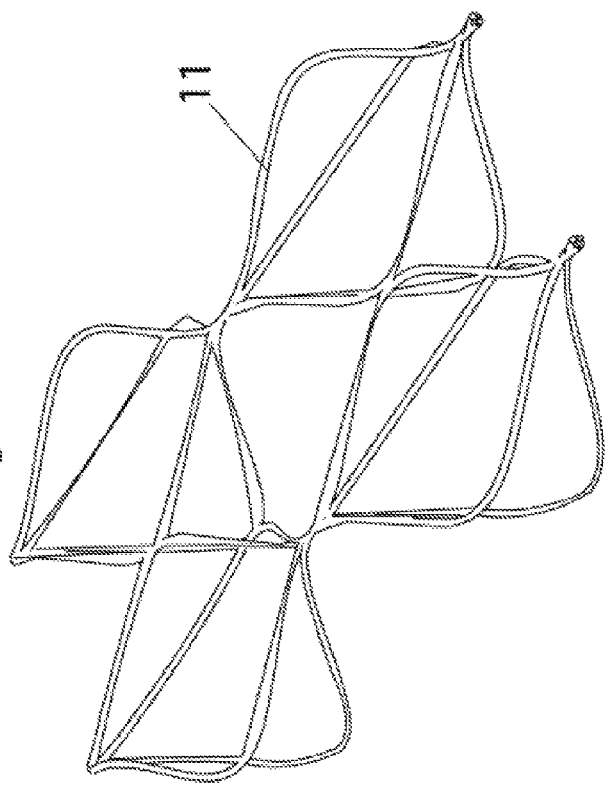
FIG. 12e is a view showing yet another possible arrangements of structural elements according to the invention.

FIG. 9 shows a variant of the example of FIG. 8, where first of all, a flow aid 7 is applied onto the flexible tube 1 so that the liquid plastics material 3 can penetrate more effectively between heat-shrinkable tubing 5 and flexible tube 1. The tubular woven fabric 2 (here directly as the tube) is then applied in two layers with a flow aid 7 as an intermediate layer.

FIGS. 10a and 10b show that the tubular woven fabric 2 can either be woven as a prefabricated biaxial tube (FIG. 10a) or from rovings 8 directly on the flexible tube 1.

FIG. 11a shows a tubular woven fabric 2 which is in the form of a cylinder barrel and has an internal diameter such that it could be pushed around a flexible tube 1, as shown in dashed lines in FIG. 11b. However, the tubular woven fabric 2 can also be configured, as visible in the right-hand part of FIG. 11b, such that it is extensible in the longitudinal direction and thus reduces its internal diameter and can thus be introduced inside the flexible tube 1.

FIG. 12a to 12e show different configurations how the individual structural elements 10 could be arranged relative to one another to form an arrangement 11. On the one hand, the structural elements 10 could be arranged aesthetically, and on the other hand they could be used for relatively complex structures, such as construction modules, support elements, supporting frameworks and freely formable and configurable plane load-bearing structures.

Figure 13A:
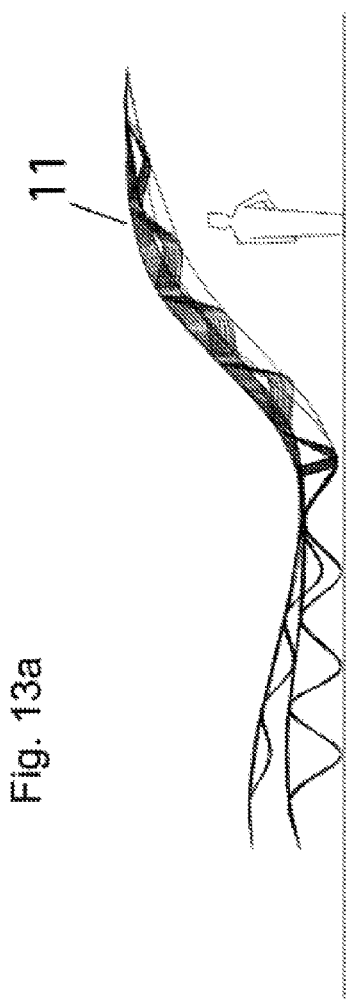
FIG. 13a is a view of an arrangement according to the invention of a structural element.
Figure 13B:
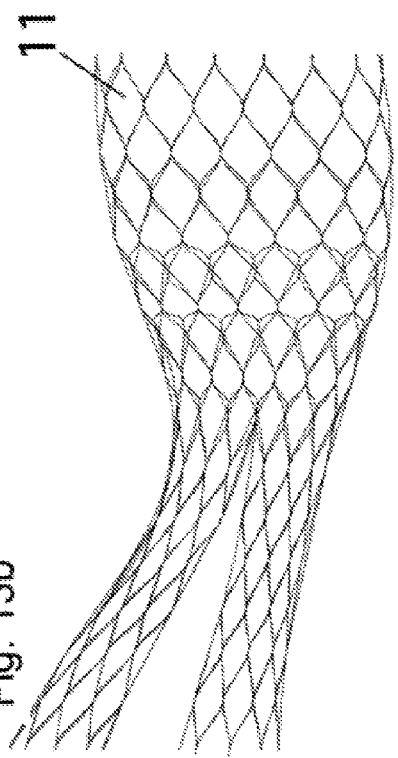
FIG. 13b is another view of an arrangement according to the invention of a structural element.
Figure 13C:
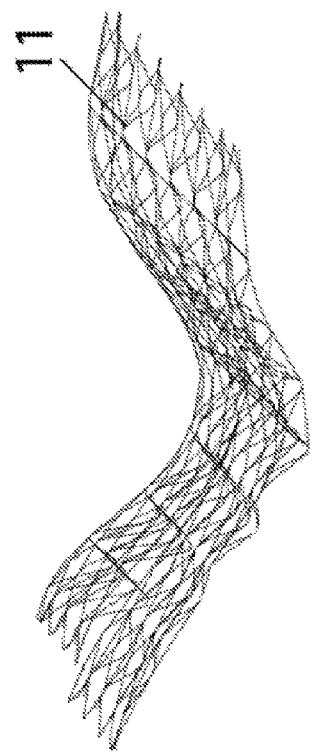
FIG. 13c is a view of an arrangement according to the invention of a structural element.

FIG. 13a to 13c show three views of an arrangement 11 according to the invention of structural elements 10. FIG. 13a shows a side view, FIG. 13b shows a plan view and FIG. 13c shows an oblique view. For clarification purposes, a person is shown in FIG. 13a to clearly show that the arrangement 11 forms a type of roof construction.

Of course it is conceivable and is provided in further embodiments to join the structural elements according to the invention to produce arrangements for further uses, for example for roof constructions and pavilions, ceiling and facade elements, furniture and in particular chairs, lamps and illumination bodies, room installations and further objects of art or aesthetic creations.

While specific embodiments of the invention have been shown and described in detail to illustrate the application of the principles of the invention, it will be understood that the invention may be embodied otherwise without departing from such principles.

The invention claimed is:

1. A method for producing a structural element, comprising:
    forming a fiber-reinforced plastics material, wherein a flexible tube comprises at least one of rubber, PVC, PE, PA, PU, silicones and PTFE, wherein a tubular woven fabric is provided with a tubular sheath, said flexible tube being provided with the tubular woven fabric by inserting the tubular woven fabric inside the flexible tube, wherein a flow aid is introduced one of between the tubular sheath and the tubular woven fabric and between the flexible tube and the tubular woven fabric, said flexible tube and said tubular woven fabric being shaped into a bent form, wherein a liquid plastics material is applied to the tubular woven fabric after said flexible tube has been provided with the tubular woven fabric by introducing the liquid plastics material inside said flexible tube and between said flexible tube and said tubular sheath by applying an elevated pressure, wherein the liquid plastics material applied to the tubular woven fabric is subsequently cured, wherein a pressure is introduced only into a volume between said flexible tube and said tubular sheath such that said liquid plastics material only impregnates said tubular woven fabric located between said flexible tube and said tubular sheath.

2. A method for producing a structural element, comprising:
    providing a flexible tube comprising a flexible tube interior space;
    providing a tubular woven fabric;
    inserting said tubular woven fabric in said flexible tube interior space;
    bending said flexible tube and said tubular woven fabric after inserting said tubular woven fabric in said flexible tube interior space to form a bent flexible tube and tubular woven fabric structure;
    applying liquid plastic material to said tubular woven fabric;
    curing said liquid plastic material after said liquid plastic material has been applied to said tubular woven fabric, wherein said tubular woven fabric comprises a tubular sheath located in said flexible tube interior space;
    introducing a flow aid one of between the tubular sheath and the tubular woven fabric and between the flexible tube and the tubular woven fabric, wherein said liquid plastic material is introduced inside said flexible tube and between said flexible tube and said tubular sheath by applying an elevated pressure, said flexible tube comprising at least one of rubber, PVC, PE, PA, PU, silicones and PTFE.

3. A method for producing a structural element, comprising:
    providing a flexible tube comprising a flexible tube interior space;
    providing a tubular woven fabric;
    inserting said tubular woven fabric in said flexible tube interior space;
    bending said flexible tube and said tubular woven fabric after inserting said tubular woven fabric in said flexible tube interior space to form a bent flexible tube and tubular woven fabric structure;
    applying liquid plastic material to said tubular woven fabric;
    curing said liquid plastic material after said liquid plastic material has been applied to said tubular woven fabric, wherein said tubular woven fabric comprises a tubular sheath located in said flexible tube interior space;

introducing a flow aid one of between the tubular sheath and the tubular woven fabric and between the flexible tube and the tubular woven fabric, wherein said liquid plastic material is introduced inside said flexible tube and between said flexible tube and said tubular sheath by applying an elevated pressure, said flexible tube comprising at least one of rubber, PVC, PE, PA, PU, silicones and PTFE, wherein a pressure is introduced only into a volume between said flexible tube and said tubular sheath such that said liquid plastic material only impregnates said tubular woven fabric located between said flexible tube and said tubular sheath.

* * * * *